United States Patent [19]
Guberman et al.

[11] 3,711,896
[45] Jan. 23, 1973

[54] ULTRA-SONIC MEAT TENDERIZING APPARATUS

[75] Inventors: Jerald Guberman; Herman D. Holt, both of Las Vegas, Nev.

[73] Assignee: Advance Patent Technology, Inc., Las Vegas, Nev.

[22] Filed: Feb. 25, 1970

[21] Appl. No.: 13,901

[52] U.S. Cl. ........................................17/25, 99/107
[51] Int. Cl. .................................................A22c 9/00
[58] Field of Search ..............................17/25; 99/107

[56] References Cited

UNITED STATES PATENTS

| | | |
|---|---|---|
| 2,806,246 | 9/1957 | Simjian........................................17/25 |
| 2,880,663 | 4/1959 | Simjian.....................................17/25 X |
| 2,980,537 | 4/1961 | Hagen........................................99/107 |

Primary Examiner—Lucie H. Laudenslager
Attorney—Allen E. Botney

[57] ABSTRACT

The present invention is one in which ultra-sonic energy is used to break down the muscle fibers in meat, thereby tenderizing the meat. The device is basically simple. The meat is placed between metal plates to which ultra-sonic transducers have been bonded. Electrical energy is transformed by the transducers into sonic waves, and the meat need only be subjected to this form of energy for a period of time.

1 Claim, 3 Drawing Figures

PATENTED JAN 23 1973 3,711,896

INVENTORS
JERALD GUBERMAN
HERMAN D. HOLT
BY Allen E. Botney
ATTORNEY

ULTRA-SONIC MEAT TENDERIZING APPARATUS

The present invention relates in general to the art of tenderizing meat and more particularly relates to ultrasonic meat tenderizing apparatus.

As is well known, meat is tenderized by softening or breaking down the muscle fiber in the meat so as to make it more edible. In the past, this was accomplished either mechanically, such as by pounding, scoring or slicing the meat, or chemically, such as by adding condiments to it, or even by a combination of both techniques. However, these older methods left a great deal to be desired. Thus, aside from the work involved, mechanical tenderization would oftentimes result in damage to the meat. Similarly, the use of chemical additives usually resulted in the non-uniform cooking of the meat which, in turn, resulted in one part of the meat being more rapidly browned or cooked than another part. Accordingly, there has been a long felt need for a better way by which to tenderize meat.

The present invention fulfills this need and it does so through the use of ultra-sonic energy, that is to say, by means of high-frequency sound waves that penetrate deep into the muscle, fat and bone structure of the meat when applied to it. The sonic waves attack the fibers of the meat and soften (tenderize) them, while at the same time breaking down the protein enzymes. As a result, spices and flavoring added to the meat while it is cooking can penetrate more readily and more deeply. Furthermore, the present invention also tends to deter the meat from shrinking, apparently due to the more rapid penetration of the heat while the meat is cooking and also to the increased elasticity of the muscle fibers.

It is, therefore, an object of the present invention to provide a meat tenderizing apparatus that uses ultrasonic energy to tenderize the meat.

It is a further object of the present invention to provide an ultra-sonic apparatus that can be used to tenderize packaged, unpackaged and canned meats.

The novel features which are believed to be characteristic of the invention, both as to its organization and method of operation, together with further objects and advantages thereof, will be better understood from the following description considered in connection with the accompanying drawings in which embodiments of the invention are illustrated by way of example. It is to be expressly understood, however, that the drawings are for the purpose of illustration and description only and are not intended as a definition of the limits of the invention.

Figure 1:
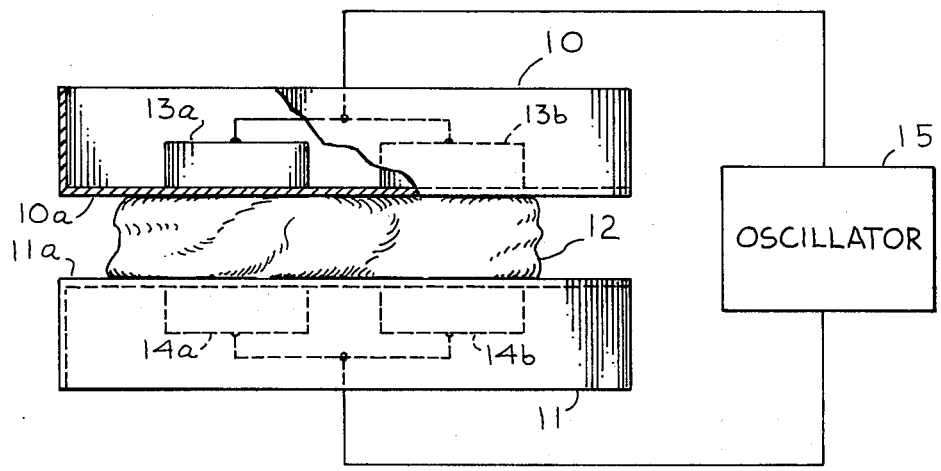
FIG. 1 illustrates a first embodiment of an ultra-sonic meat tenderizer according to the present invention.

Referring now to the drawings for a more detailed understanding of the invention, the embodiment in FIG. 1 is shown to include a pair of metal housings 10 and 11 that are positioned in face-to-face relationship with one another, the meat, designated 12, being placed therebetween and in contact with the housings' faceplates 10a and 11a. Although a number of different materials may be used in the construction of housings 10 and 11, the housings are, nevertheless, preferably made of stainless steel materials to provide the desired hygienic operating conditions. Furthermore, housings 10 and 11 are preferably hollow so that transducers can be mounted in the hollow of each, two transducers being mounted in each housing with the transducers mounted in housing 10 being designated 13a and 13b and those mounted in housing 11 being designated 14a and 14b. As shown in the figure, the transducers are bonded to the faceplates so that a maximum amount of the power generated may be transferred to the faceplates and, thereby, to the meat.

Transducers 13 and 14 are preferably piezo-electric type transducers of the ceramic variety and they are all electrically connected to an oscillator 15 designed to generate energy at specific frequencies and to operate under normal alternating-current voltages in the range of from 120 to 240 volts. The oscillator itself can be and is preferably designed to step-up the input voltage to the required operating level. With respect to the range of operating frequencies, this can be between 25 kilocycles and 100,000 kilocycles, such a broad frequency range permitting the apparatus to be designed for different kinds of applications depending upon the type of meat to be tenderized.

It will be recognized by those skilled in the electromechanical arts that the transducers in the FIG. 1 embodiment do not necessarily have to be given a flat surface shape but, rather, could be constructed to direct energy in a precise pattern. For example, if a tenderizer were to be built strictly for the purpose of processing a common hamburger where the patty is generally round in one view and slightly eliptical in another, the transducer could be designed to this specific shape, only one transducer therefore being needed on either side of the meat. The physical size of the unit can, therefore, be smaller. Furthermore, although the FIG. 1 embodiment shows two transducers mounted on either side of the meat, it will also be recognized that it is possible to add as many transducers as is needed to tenderize meats of varying shapes and sizes.

Figure 2:
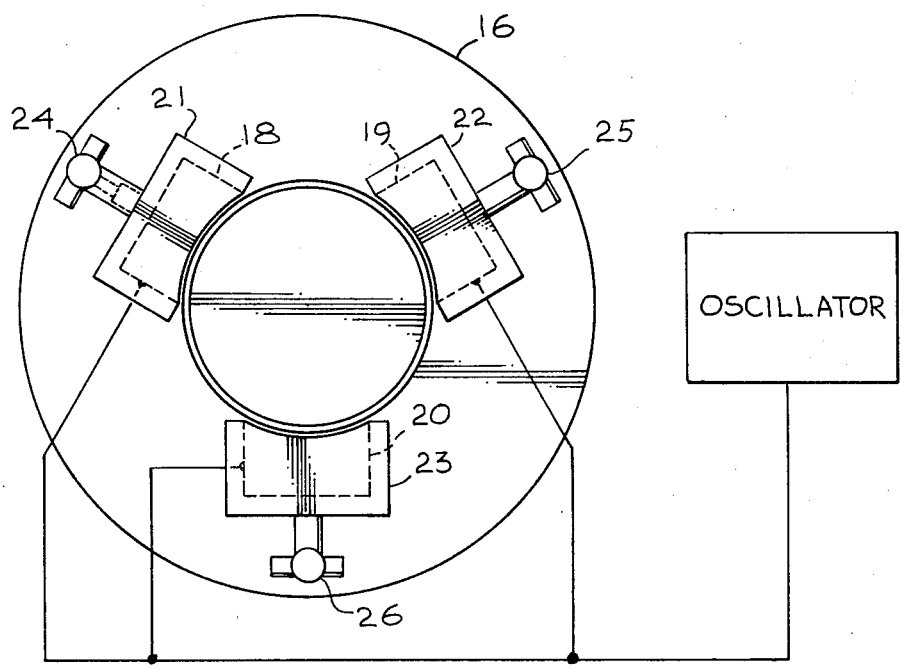
FIG. 2 illustrates a second embodiment of an ultrasonic meat tenderizer according to the present invention.

One of the attractive features of the present invention is that it may be adapted to tenderize meat that is already canned, as is illustrated in FIG. 2 wherein the embodiment is shown to include a platform or base 16 on which a standard food-packaging can 17, containing meat of some kind, is positioned. The can is centered by three piezo-electric transducers 18, 19 and 20 that are respectively mounted in individual housings 21, 22 and 23 equally spaced from one another around the can. As shown in the figure, the faces of the housings and the transducers therein may be given the same curved configuration as the can itself, which serves the purpose not only of transferring a maximum amount of power to the meat in the can but also of holding the can rigidly in place during the operation of the apparatus. As before, the transducers are electrically connected to an oscillator 15 which generates the necessary ultrasonic power.

Housings 21, 22 and 23 may be moved into abutment with can 17 and held there with the aid of devices 24, 25 and 26, which may be manually operated devices and preferably, piston, spring or hydraulically operated devices so that when a can is dropped between them, the can is automatically engaged, the power is applied, and the ultra-sonic energy directed inward toward and into the meat in the can. After a period of time, the transducer housings are released and the can is then permitted to either drop down and out or be lifted out. Consequently, the concept can be applied directly to the meat packaging business on an assembly line basis.

Figure 3:
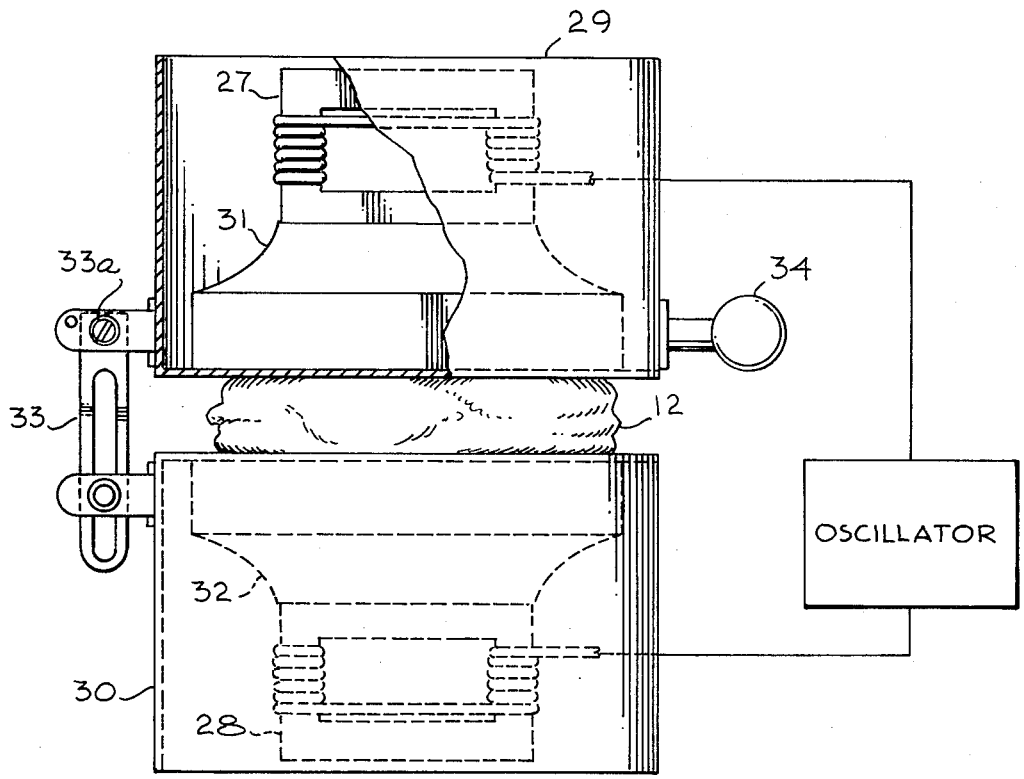
FIG. 3 illustrates a third embodiment of an ultrasonic meat tenderizer according to the present invention.

Referring now to the FIG. 3 embodiment, the same basic idea is shown there, but utilizing magnetostrictive transducers 27 and 28 instead. Thus, here again enclosed housings 29 and 30 are employed on opposite sides of the meat to be tenderized, just as in the FIG. 1 embodiment, transducer 27 being mounted inside housing 29 and transducer 28 being mounted inside housing 30. In addition to the magnetostrictive transducers, each housing also contains an ultra-sonic horn, the ultra-sonic horn in housing 29 being designated 31 and the horn in housing 30 being designated 32. The magnetostrictive transducers are respectively bonded to the ultra-sonic horns and, as is well known by those skilled in the art, the horns match the impedance of the magnetostrictive transducers to that of the housings so as to effect a maximum transfer of power to the meat 12. Finally, the FIG. 3 embodiment includes a self-adjusting hinge 33 coupled between both housings and a handle 34 mounted on housing 29, the handle being used to lift housing 29 so that the meat can be placed between or removed from between the housings. When lifted or lowered, housing 29 rotates about its point of connection to hinge 33, this point of connection being designated 33a in the figure.

As in the previously discussed embodiments, oscillator 15 supplies the electrical energy to the transducers, the alternating-current; in the present instance, being applied to the transducer coils 27a and 28a. However, in addition to the alternating current, in this embodiment the transducers are also biased by a direct-current voltage in the range of from 12 to 24 volts. The direct-current voltage is also applied to the transducer coils, the voltage source not being shown in the figure for sake of clarity and because the biasing of magnetostrictive transducers is so well known and understood. Needless to say, the electrical energy is transformed into high-frequency mechanical vibrations of the transducers and since the transducers are in direct contact with the horns, the horns also vibrate. The vibrational frequency is a function of the input frequency to the transducers and this is designed to be between 18 and 23,000 cycles per second. By means of these mechanical vibrations, the ultra-sonic energy is transferred from the horns through their respective housings and into the meat.

To summarize it all, the operating frequency may range from 18 to 100,000 kilocycles per second depending upon which embodiment is selected and its specific design features. The alternating-current voltage may be between 120 to 240 volts and, in the event magnetostrictive transducers are used, the direct-current voltage may be between 12 to 24 volts. With respect to the power output of the oscillator, this may be between 50 to 1,000 watts depending upon how many transducers need to be driven and the kind of transducer employed. The transducer may be either of the piezo-electric type or of the magnetostrictive variety, the kind of transducer used determining whether the oscillator will be one of high voltage-low current or of low voltage-high current. Thus, with piezo-electric transducers, a moderately high voltage-low current oscillator is preferable whereas a low voltage-high current oscillator is desirable with magnetostrictive transducers.

Although a number of arrangements of the invention have been illustrated above by way of example, it is not intended that the invention be limited thereto. Accordingly, the invention should be considered to include any and all modifications, alterations or equivalent arrangements falling within the scope of the annexed claims.

Having thus described the invention, what is claimed is:

1. An ultrasonic apparatus for tenderizing meat in a cylindrically-shaped can, said apparatus including: three hollow housing structures spaced around said can, the sides of said housing structures facing the can conforming to the shape of the can to rigidly hold it between them and to provide maximum energy transfer thereto, said housing structures being mounted to move radially to and from the can; means for moving each of said housing structures to and from the can; three ultrasonic transducers respectively mounted within the hollow of said housing structures and coupled thereto; and oscillator means coupled to said transducers for applying signals to said transducers in the ultra-sonic frequency range.

* * * * *